(12) United States Patent
Okamoto et al.

(10) Patent No.: US 7,269,335 B2
(45) Date of Patent: Sep. 11, 2007

(54) IMAGE SIGNAL PROCESSING APPARATUS

(75) Inventors: Masayoshi Okamoto, Osaka (JP);
Shigeaki Yamamoto, Hyogo (JP);
Nobuhide Dotsubo, Osaka (JP)

(73) Assignee: Sanyo Electric Co., Ltd.,
Moriguchi-shi, Osaka (JP)

( * ) Notice: Subject to any disclaimer, the term of this patent is extended or adjusted under 35 U.S.C. 154(b) by 1123 days.

(21) Appl. No.: 10/144,856

(22) Filed: May 15, 2002

(65) Prior Publication Data

US 2002/0172502 A1  Nov. 21, 2002

(30) Foreign Application Priority Data

May 18, 2001  (JP)  .............. 2001-148860

(51) Int. Cl.
*H04N 5/76* (2006.01)
*H04N 5/00* (2006.01)
*H04N 7/00* (2006.01)

(52) U.S. Cl. ........................... 386/95; 386/125
(58) Field of Classification Search ........... 386/45, 386/95, 125–126, 117; 348/231.2
See application file for complete search history.

(56) References Cited

U.S. PATENT DOCUMENTS 5,526,041 A * 6/1996 Glatt ................... 348/143
5,978,791 A * 11/1999 Farber et al. ................ 707/2
6,192,191 B1 * 2/2001 Suga et al. ................ 386/120
6,760,042 B2 * 7/2004 Zetts ........................ 715/716

FOREIGN PATENT DOCUMENTS

| JP | 06-242999 A | 9/1994 |
| JP | 09-016449 A | 1/1997 |
| JP | 09-186953 A | 7/1997 |
| JP | 2000-236503 A | 8/2000 |
| JP | 2001-111920 A | 4/2001 |

* cited by examiner

Primary Examiner—Thai Q. Tran
Assistant Examiner—Nigar Chowdhury
(74) Attorney, Agent, or Firm—Westerman, Hattori, Daniels & Adrian LLP

(57) ABSTRACT

An image signal processing apparatus includes a hard disk. The hard disk is as necessary created with a directory to which time information according to a time counter is assigned. An image file is stored in a latest directory having the latest creation time among a plurality of directories thus created. When a time indicated by the time counter is modified retroactive to the past, a marker is added to a directory having the time information according to the time counter before being modified. The latest directory is detected on the basis of the marker and the time information.

14 Claims, 14 Drawing Sheets

| 28b | | T |
|---|---|---|
| P50 → | 101IM00 | 2001/4/29 18:07:28 |
| P49 → | 102IM00 | 2001/4/29 18:12:28 |
| P48 | ⋮ | ⋮ |
| ⋮ → | 148IM00 | 2001/4/29 22:02:28 |
| P2 → | 149IM00 | 2001/4/30 08:25:12 |
| P1 | | |

(B)

| 28b | | T |
|---|---|---|
| P50 → | 101IM10 | 2001/4/29 18:07:28 |
| P49 → | 102IM10 | 2001/4/29 18:12:28 |
| P48 | ⋮ | ⋮ |
| ⋮ → | 148IM10 | 2001/4/29 22:02:28 |
| P2 → | 149IM10 | 2001/4/30 08:25:12 |
| P1 | | |

IMAGE SIGNAL PROCESSING APPARATUS

BACKGROUND OF THE INVENTION

1. Field of the Invention

The present invention relates to an image signal processing apparatus applied to a digital camera, for example. More specifically, the present invention relates to an image signal processing apparatus storing an image signal in any one of a plurality of directories each of which is created as necessary and time information based on a time counter is assigned to.

2. Description of the Background

In a case of recording a photographed image signal onto a recording medium, each image signal is stored in a directory created in the recording medium. When one directory becomes full, another directory is newly created, and the image signal is stored in the new directory. Each directory is supplied with time information based on a time counter at a time of creating. Accordingly, if a latest directory is specified on the basis of the time information, and the image signal is stored in the latest directory, the image signal is accumulated in each directory in order of creating the directory. Thus, it is possible to manage the image signal with ease.

However, when a time indicated by the time counter is modified retroactive to the past, the time information according to the modified time counter is assigned to a directory to be created after that. Thereupon, even if the latest directory is specified on the basis of the time information, the specified directory is a full directory created in the past, and therefore, it is impossible to store the image signal in the directory. Furthermore, a free space generated by erasing one part of the image signal allows the image signal to be stored in the directory, however; this causes a storing destination of the image signal to be out of sequence. That is, if a setting of the time counter is modified retroactive to the past, it is impossible to properly manage the image signal.

SUMMARY OF THE INVENTION

Therefore, it is a primary object of the present invention to provide a novel image signal processing apparatus.

Another object of the present invention is to provide an image signal processing apparatus capable of properly managing an image signal irrespective of modification of a setting of the time counter.

According to the present invention, an image signal processing apparatus storing an image signal in any one of a plurality of directories each of which is created as necessary and time information according to a time counter is assigned to comprises: a first assigner for assigning, when a time indicated by the time counter is modified retroactive to the past, a marker to a directory having the time information according to the time counter before modifying the time; a first detector for detecting a latest directory having a latest creation time on the basis of the marker and the time information; and a storage for storing the image signal in the latest directory.

The directory is created as necessary, and the time information according to the time counter is assigned to the directory. The image signal is stored in any one of a plurality of directories thus created. When the time indicated by the time counter is modified retroactive to the past, the marker is assigned to the directory having the time information according to the time counter before modifying the time by the first assigner. The first detector detects the latest directory having the latest creation time on the basis of the marker and the time information, and the storage stores the image signal in the detected latest directory. Specifically, even if the time counter is modified retroactive to the past, the image signal is stored in the latest directory having the latest creation time, and therefore, a storing destination of the image signal is not out of sequence. Thus, it is possible to properly manage the image signal.

If a new directory is created when the time indicated by the time counter is modified retroactive to the past, and the time information according to the time counter after modification of the time is assigned to the new directory, the new directory is the latest directory detected by the first detector next.

If an oldest directory having the oldest creation time is detected on the basis of the marker and the time information, and the oldest directory is erased when the predetermined condition is satisfied, it is possible to restrain a total number of the directories. It is noted that in a case that an identification number being circularly successive is assigned to each directory in order of creation, a directory having an identification number succeeding to that of the latest directory becomes the oldest directory.

If ranking or classification according to the creation time is assigned to each directory on the basis of the marker and the time information, and a representative image of each directory is displayed according to the ranking, it is possible to easily grasp the contents of each directory.

It is preferable that the ranking is first assigned to one of the directories to which the markers are assigned and the directories to which the markers are not assigned, and then, another of the directories to which the markers are assigned and the directories to which the markers are not assigned.

In a case of providing an image sensor fixed at an arbitrary position, the image signal is an image signal of an object photographed by the image sensor. Since the image sensor is fixed, no great change occurs between the image signals. When recognizing such the image signals in order of photographing, the marker and the time information of the directory are high in importance.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 10(A) is an illustrative view showing the other example of the directory list;

FIG. 10(B) is an illustrative view showing a further example of the directory list;

DETAILED DESCRIPTION OF THE PREFERRED EMBODIMENTS

Figure 1:
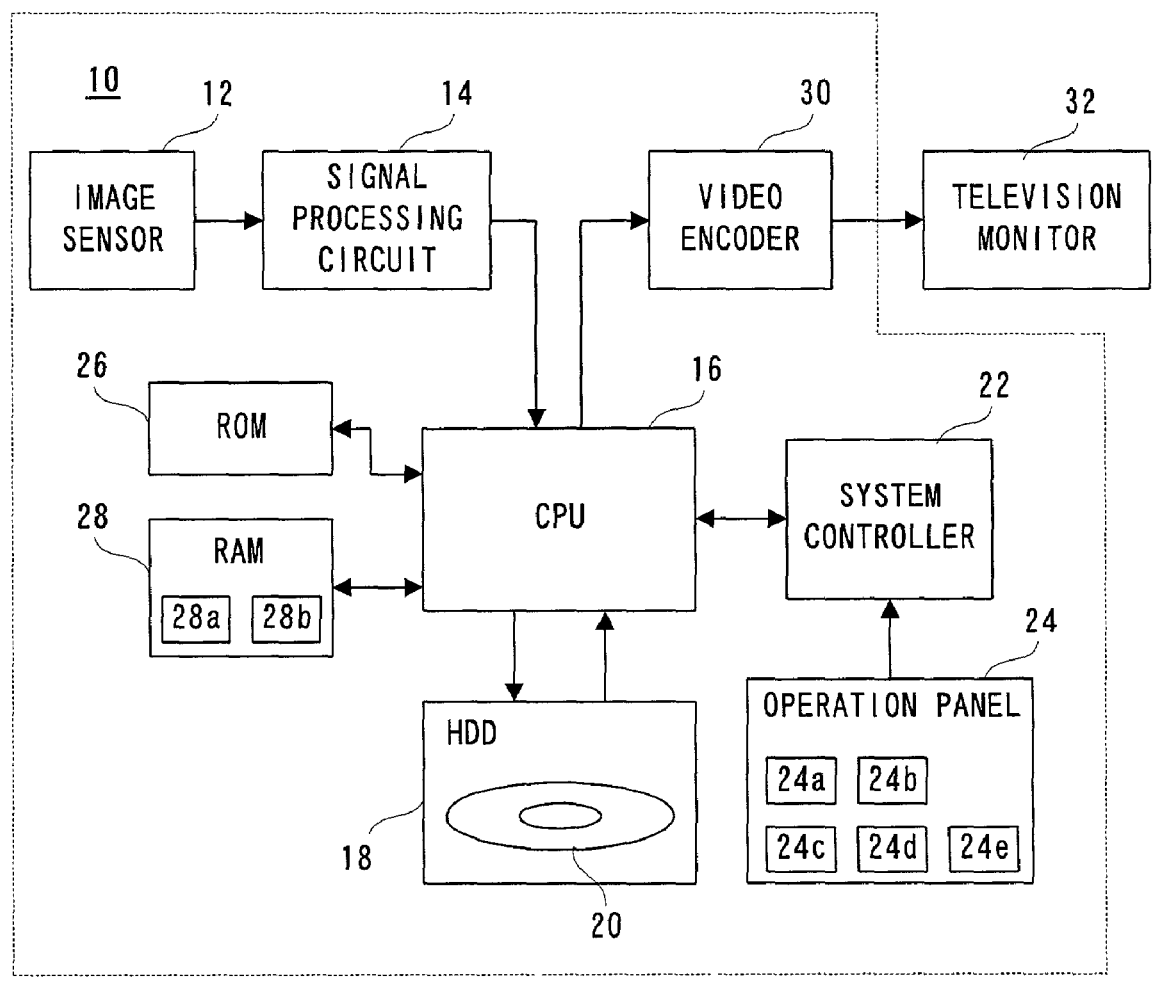
FIG. 1 is a block diagram showing one embodiment of the present invention.

Referring to FIG. 1, a surveillance camera 10 of this embodiment is fixed at a surveillance position. When a recording key 24*a* provided on an operation panel 24 is operated, a corresponding state signal is applied from a system controller 22 to a CPU 16. The CPU 16 determines that a recording start operation is performed, and drives an image sensor 12 at a frame rate of 3 fps. The image sensor 12 outputs an image signal at a ratio of 3 frames per second. A signal processing circuit 14 performs color separation, white balance adjustment, YUV conversion and etc. on the outputted image signal, and the processed image signal is applied to the CPU 16.

The CPU 16 compresses the image signal applied from the signal processing circuit 14 by a JPEG format so as to create an image file including a compressed thumbnail image signal and a compressed primary image signal. The image file is created every ⅓ second, and the created image file is recorded on a hard disk 20 being detachable by an HDD (Hard Disc Drive) 18. When a completion key 24*c* on the operation panel 24 is pressed, a corresponding state signal is applied from the system controller 22 to the CPU 16. The CPU 16 determines that a recording completion operation is performed, and disables the image sensor 12.

Figure 2:
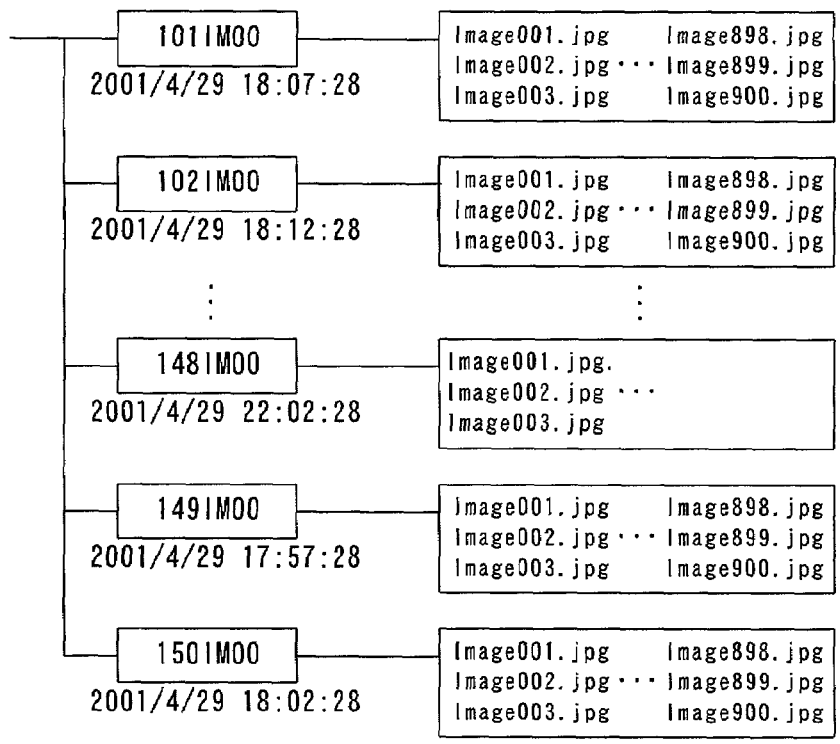
FIG. 2 is an illustrative view showing one example of a directory configuration.

The hard disk 20 has a directory configuration shown in FIG. 2. According to FIG. 2, a total of 50 directories each of which has a directory name "* * * IM00" (* * *: circularly renewed directory number having 101 to 150) is formed on the hard disk 20. A total of 900 image files each of which has a file name "Image xxx.jpg"(xxx: file number of 001~900) is stored in each directory. Time information (time stamp) indicated by a clock (time counter) 28*a* stored in a RAM 28 is assigned to either the directory or the image file at a time of creating. It is apparent from the assignment of the time information that the directory "101IM00" is created at 2001/4/29 18:07:28 and the directory "102IM00" is created at 2001/4/29 18:12:28.

Figure 8:
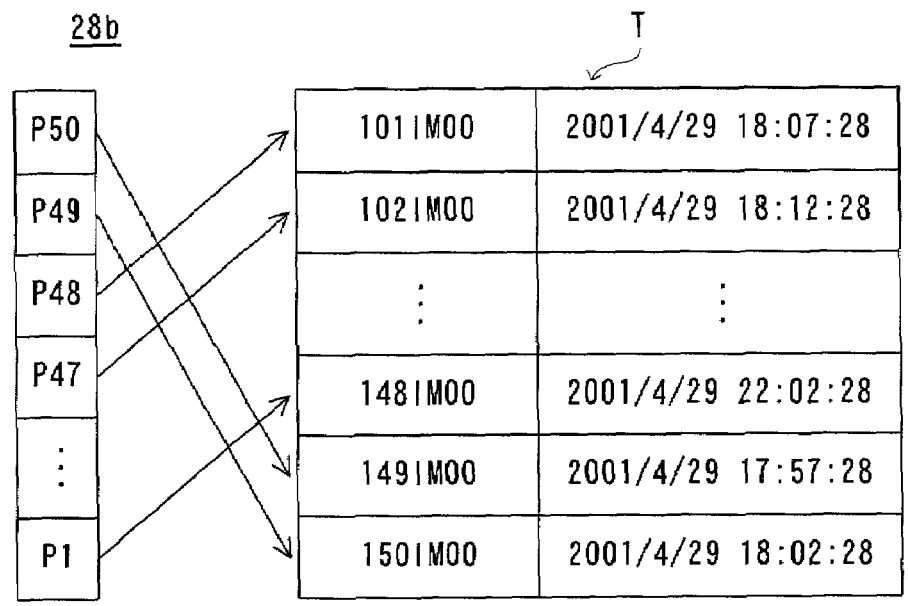
FIG. 8 is an illustrative view showing one example of a directory list.

When the recording of 2001/4/29 is completed before the directory "148IM00" becomes full, and the recording key 24*a* is operated again at around 8:00 a.m. in the next morning, a directory list 28*b* shown in FIG. 8 is created in the RAM 28. First, the directory name and the time information of each directory are detected from the hard disk 20, and the detected directory name and time information are registered in a table T in the order of the directory number. Subsequently, a plurality of pointers P1~P50 are respectively assigned to the registered directory names in descending order of the directory number with a directory name having the latest time information as a starting point.

According to FIG. 8, since "148IM00" has the latest time information, the pointers P1, P2, P3 . . . are respectively assigned to the directory names with "148IM00" as the starting point in order of "148IM00"→"147IM00"→"146IM00" . . . . Since the directory number is circular from "101" to "150", after the pointer P48 is assigned to "101IM00", the pointer P49 is assigned to "150IM00". As a result, the pointers P1 to P50 respectively point out the directory names in the order of creating the directory. That is, the larger the number assigned to the pointer is, the older a creation time of the directory pointed by each pointer becomes.

Figure 3:
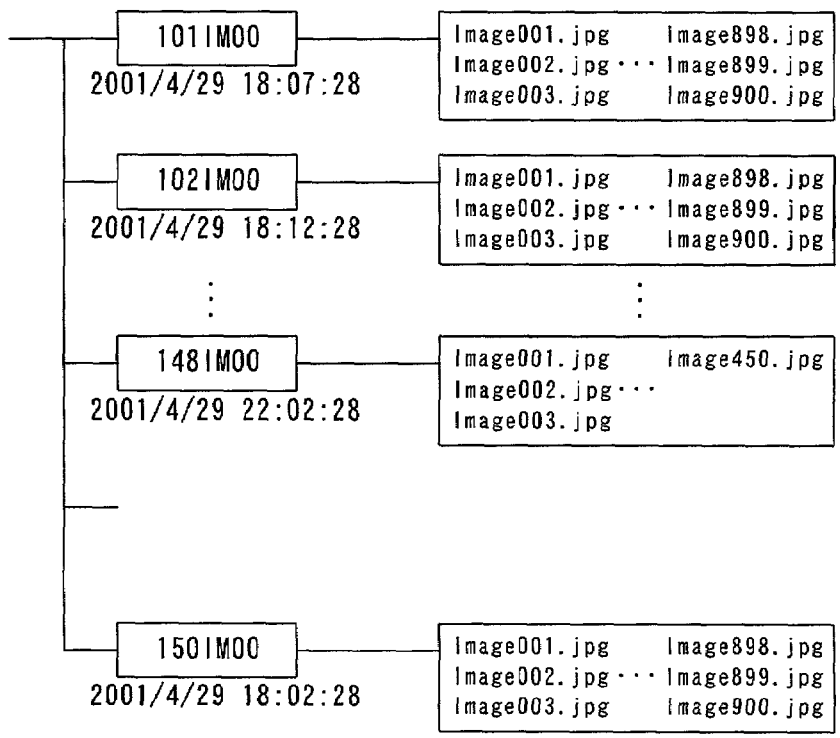
FIG. 3 is an illustrative view showing another example of the directory configuration.

After completion of creating the directory list 28*b*, the image sensor 12 is driven so as to create the image file every ⅓ second. The created each image file is stored in the latest directory "148IM00". When the number of image files stored in "148IM00" reaches 450, an oldest directory is erased from the hard disk 20. Since the directory number is circularly successive, the oldest directory is "149IM00" having the directory number succeeding to that of the latest directory "148IM00". Accordingly, at a time the 450 of image files are stored in "148IM00", "149IM00" is erased as shown in FIG. 3. As the erasure of the directory, image files of the lower level of the erased directory are also erased.

Figure 4:
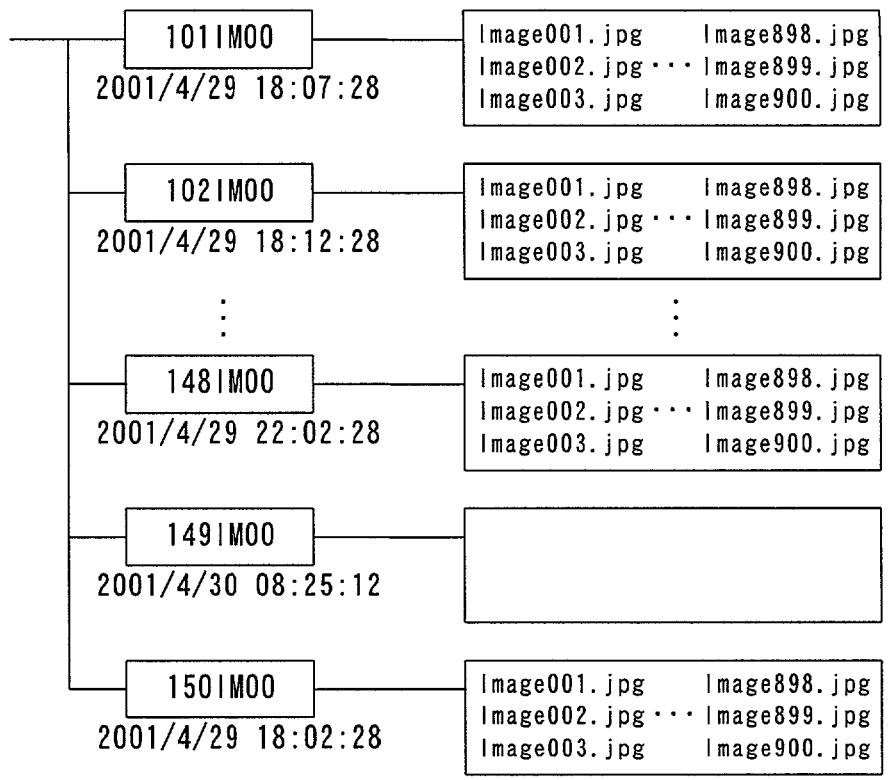
FIG. 4 is an illustrative view showing the other example of the directory configuration.

When the 900 of image files are accumulated in the latest directory, the directory becomes full. Accordingly, a directory having a directory number succeeding to the directory which becomes full is newly created, and the time information of the clock 28*a* is assigned to the created new directory. Thus, the new directory becomes the latest directory, and an image file obtained after creating the new directory is stored in the new directory. Referring to FIG. 4, when "148IM00" becomes full, "149IM00" is newly created, and the time information indicative of a current time (Apr. 30, 2001 8:25:12) is assigned thereto. Image files obtained thereafter is stored in "149IM00".

Figure 5:
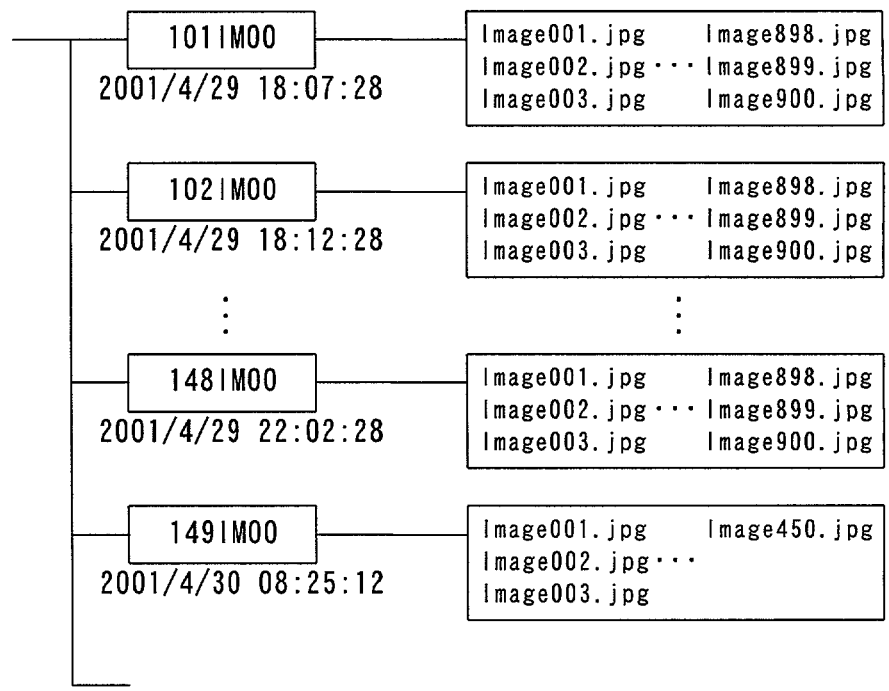
FIG. 5 is an illustrative view showing a further example of the directory configuration.
Figure 6:
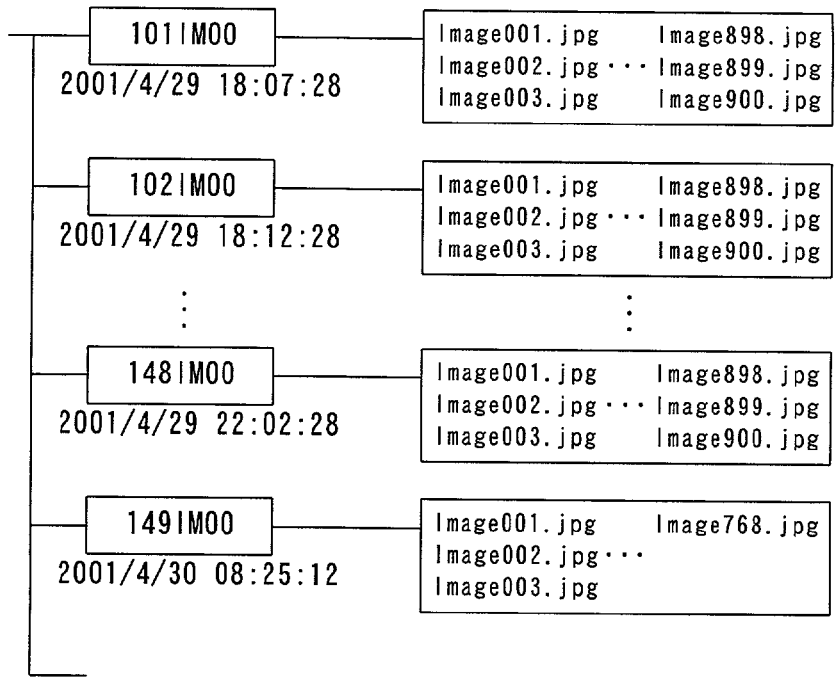
FIG. 6 is an illustrative view showing another example of the directory configuration.

When the number of image files stored in "149IM00" reaches "450", "150IM00" is erased as shown in FIG. 5. When the completion key 24*c* is operated at a time 768 of image files are stored in "149IM00", the drive of the image sensor 12 is stopped. Herein, the hard disk 20 takes a directory configuration as shown in FIG. 6.

When a clock modifying key 24*d* on the operation panel 24 is operated in a state that the recording operation is not performed, the system controller 22 applies a corresponding state signal to the CPU 16. The CPU 16 determines that a clock modifying operation is performed and modifies the time indicated by the clock 28*a*. When the time is modified in the past, the CPU 16 creates the directory list 28*b* in the same manner as the above-description. When the directory configuration shown in FIG. 6 is taken, the directory list 28*b* shown in FIG. 10(A) is created. The CPU 16 successively adds makers to all the directory names registered in the table T and all the directory names recorded on the hard disk 20. Specifically, the lower second digit of the directory name is modified from "0" to "1". Accordingly, the contents of the table T is changed from FIG. 10(A) to FIG. 10(B), and the directory names of the hard disk 20 are changed as well. That is, the directory name is modified from "* * * IM00" to "* * * IM10" as to the directory to which the time information is assigned according to the clock 28*a* before modifying the time (directory existing at a time of modifying the clock 28*a*).

After completion of adding processing of the marker, the CPU 16 newly creates a directory which has the directory number succeeding to the latest directory and has no marker, and assigns the time information according to the modified clock 28*a* to the crated new directory. When the time indicated by the clock 28*a* is modified to 1999/2/15 15:38:47 in a state that the hard disk 20 takes a directory configuration shown in FIG. 6, "150IM00" is newly created as shown in FIG. 7, and the time information indicative of the modified time is assigned to this directory.

When the recording key 24*a* is operated again after completion of operating the clock modifying key 24*d*, the CPU 16 creates the directory list 28*b* as the above-described manner. It is noted that since directories having time information before and after modifying the clock 28*a* exists in the hard disk 20, it is impossible to regard a directory having the latest time information as the latest directory.

Thus, although the process is the same as the above-described manner until each directory name is registered in the table T in the order of the directory number, in specifying the latest directory, the directory name to which the marker is added is eliminated from candidates for specifying the latest directory name. That is, the directory name having no marker becomes a candidate, and a directory name having the latest time information is specified as the latest directory name from such the candidates. When the latest directory name is specified, the pointers P1 to P50 are respectively assigned to the directory names registered in the table T with the latest directory name as the starting point.

Figure 7:
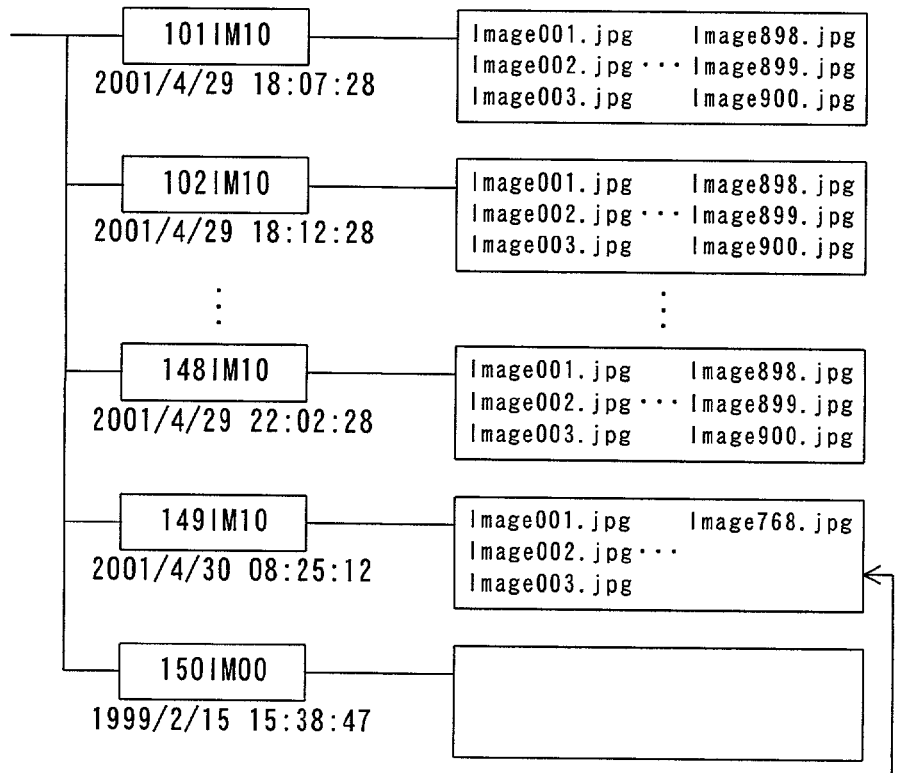
FIG. 7 is an illustrative view showing the other example of the directory configuration.
Figure 9:
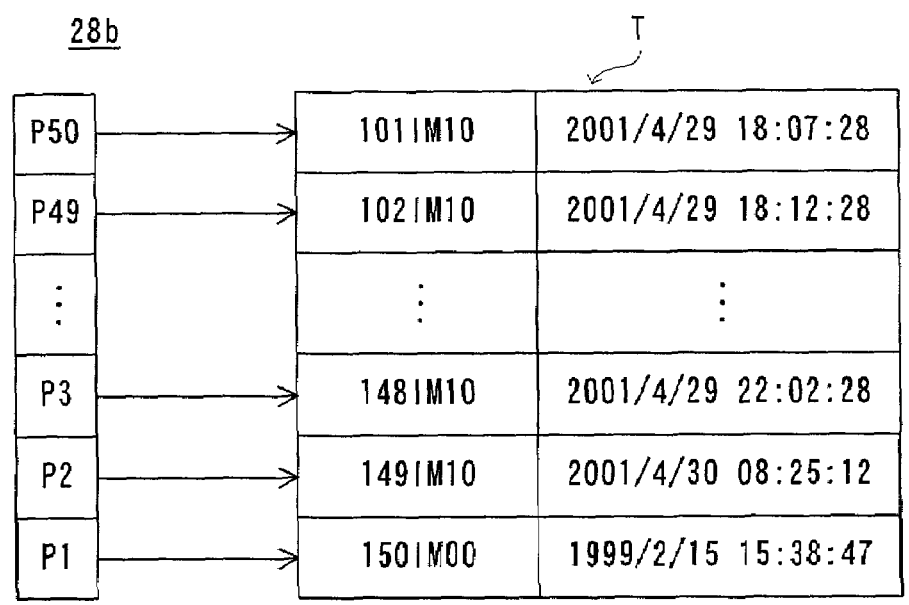
FIG. 9 is an illustrative view showing another example of the directory list.

Accordingly, when a directory to which the marker is added and a directory to which the marker is not added are existed as shown in FIG. 7, the directory list 28*b* as shown in FIG. 9 is created. Specifically, the pointers P1 to P50 are assigned to the directory names in descending order of the directory number with "150IM00" created after modification of the clock 28*a* as the starting point. Thus, even if the time indicated by the clock 28*a* is modified retroactive to the past, a directory having the latest creation time is specified as the latest directory, and the image file is properly stored in the latest directory.

Figure 11:
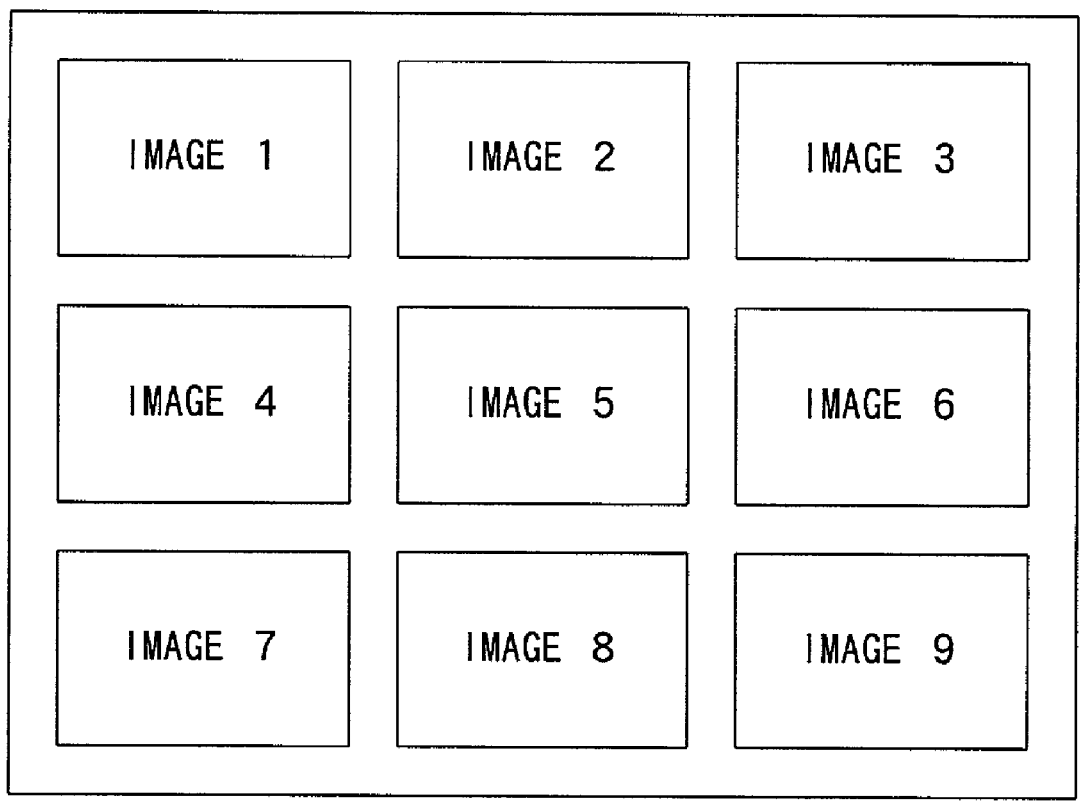
FIG. 11 is an illustrative view showing thumbnail images multi-displayed on a television monitor.

When a reproducing key 24*b* on the operation panel 24 is pressed, the system controller 22 applies a corresponding state signal to the CPU 16. The CPU 16 creates the directory list 28*b* in the same manner as an occasion of recording, specifies 9 directories pointed out by the pointers P1 to P9, and reads out the compressed thumbnail image signal from a top image file (Image 001.jpg) stored in each of the specified 9 directories. The CPU 16 expands the read 9 compressed thumbnail image signals by the JPEG format and applies 9 thumbnail image signals thus expanded to a video encoder 30. The video encoder 30 encodes the applied 9 thumbnail image signals so as to generate a composite image signal and outputs the generated composite image signal to a television monitor 32. Therefore, 9 thumbnail images are multi-displayed on the monitor screen as shown in FIG. 11. Respective thumbnail images 1 to 9 displayed are images representative of reading-out source directories and arranged on the monitor screen in order of the pointers P1 to P9.

Herein, when a desired thumbnail image is selected by the selection key 24*e*, a corresponding state signal is applied from the system controller 22 to the CPU 16. The CPU 16 determines that a thumbnail selecting operation is performed, accesses the directory corresponding to the selected thumbnail image and reads out the compressed primary image signal from each image file stored in the access destination directory. The reading-out is performed every ⅓ second in order of the file number, and the read compressed primary image signal is expanded in the JPEG format. The expanded primary image signal is applied to the television monitor 32 via the video encoder 30 and whereby, a motion image reproduced at a normal speed is displayed on the monitor screen. It is noted that the television monitor 32 is a separate body from the surveillance camera 10 and disposed at a distant place (e.g., security guards room).

The CPU 16 specifically processes flowcharts shown in FIG. 12 to FIG. 18 according to a program stored in a ROM 26. First, it is determined whether or not a recording start operation is performed in a step S1. When a recording key 24*a* is pressed, "YES" is determined, and the directory list 28*b* is created in a step S3. The directory number of the latest directory pointed by the pointer P1 is set as a counted value D in a step S5. In a step S7, the number of image files stored in the latest directory is detected, and the number of the image files +1 is set as a counted value F.

After completion of the setting of the counted values D and F, a photographing/recording process is performed in a step S9. That is, the image sensor 12 is driven, an image signal of an object photographed by the image sensor 12 is subjected to JPEG compression, and an image file including a compressed thumbnail image signal and a compressed primary image signal is stored in the latest directory through the HDD 18. The counted value F is incremented in a step S11 and the incremented counted value F is determined in following steps S13 and S15.

Where a condition of $F \leq 450$ is satisfied, it is determined that the number of image files stored in the latest directory is less than "450" and the process directly proceeds to a step S21. It is determined whether or not the completion key 24*c* is operated (recording completion operation is performed) in the step S21, and if "NO" is determined, the processes after the step S9 are repeated, however; if "YES" is determined, the process returns to the step S1. It is noted that when the recording completion operation is not performed, the processes after the step S9 are executed every ⅓ second. Therefore, an image file obtained at a frame rate of 3 fps is accumulated in the latest directory.

Where a condition of $450 < F \leq 900$ is satisfied, it is determined that the image files of 450 to 899 are reserved in the latest directory, and the number of directories created on the hard disk 20 is determined in a step S17. If the number of directories are less than "50", it is determined there is a space to create further directories, and the process directly proceeds to the step S21. On the other hand, if the number of directories is equal to "50", it is determined the new directory cannot be created without erasing an existing directory, the oldest directory is erased in a step S19 and then, the process proceeds to the step S21.

Since the directory number of the latest directory is "D", and the directory number is circular, the directory number of the oldest directory is "D+1" or "101" (when D>150). Accordingly, the directory having such the directory number is erased in the step S19.

Where a condition of F>900 is satisfied, it is determined that the number of image files stored in the latest directory reaches "900", and the process proceeds to steps after a step S23 so as to create a new directory. First, the counted value F is returned to "0" in the step S23, the counted value D is incremented in a step S25, and the counted value D is compared with "150" in a step S27. Herein, where a condition of $D \leq 150$ is satisfied, the directory number of the directory to be created is determined to be below "150", and the process directly proceeds to a step S31. On the contrary, where a condition of D>150 is satisfied, the directory number of the directory to be created is determined to be "101", the counted value D is set to "101" in a sep S29, and then, the process proceeds to the step S31.

The directory having a directory number of the counted value D is created on the hard disk 20 through the HDD 18 in the step S31. For example, where the counted value D is "145", a new directory having the directory name of "145IM00" is created, and where the counted value D is "101", a new directory having the directory name of "101IM00" is created. In a following step S33, the current time is detected referring to the clock 28a, and the time information indicative of the current time is assigned to the new directory. After completion of the time stamp process, the process shifts to the step S21. The new directory created in the step S31 becomes the latest directory, and the image file obtained by the photographing/recording process after the next time is accumulated in the new directory.

Figure 14:
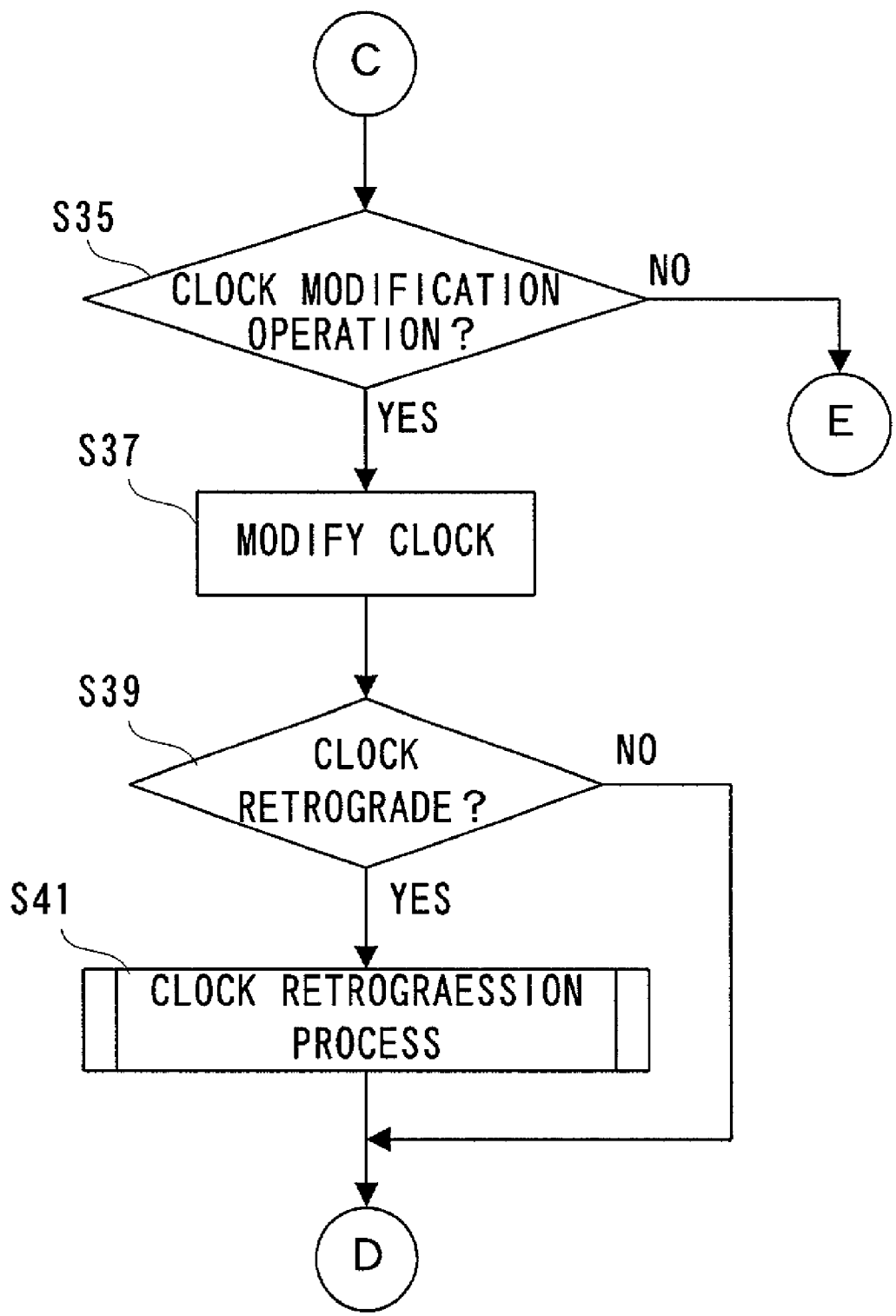
FIG. 14 is a flowchart showing the other part of the operation of FIG. 1 embodiment.

When the clock modifying key 24d on the operation panel 24 is operated, it is determined that a clock modifying operation is performed in a step S35 shown in FIG. 14, and the time of the clock 28a is modified in a step S37. A modifying direction of the time is determined in a following step S39, and in a case of a modification toward the future, the process directly returns to the step S1. On the other hand, in a case of a time modification toward the past, a clock retrogression process is executed in a step S41 and then, the process returns to the step S1.

Figure 15:
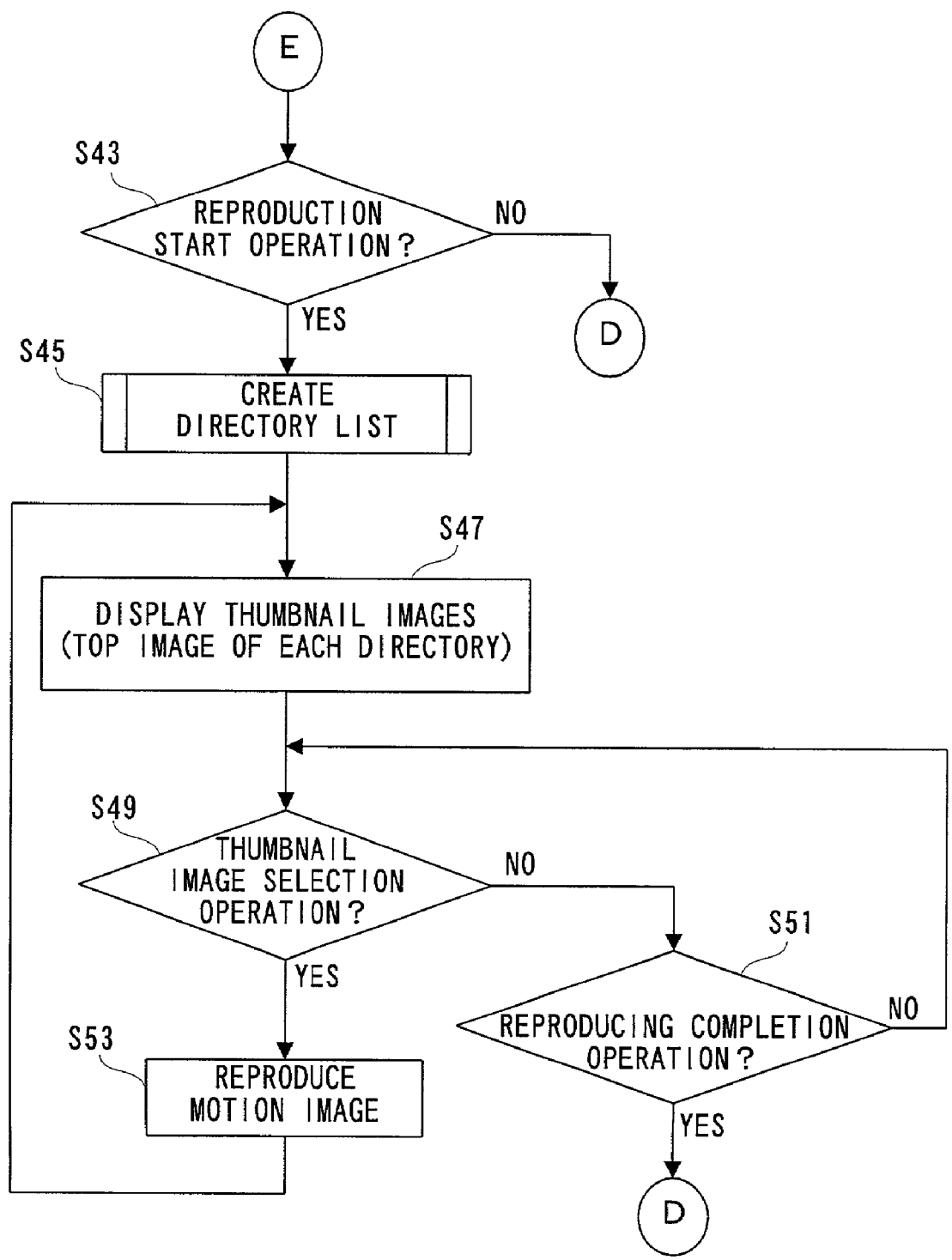
FIG. 15 is a flowchart showing a further part of the operation of FIG. 1 embodiment.

When the reproducing key 24b on the operation panel 24 is operated, it is determined a reproducing start operation is performed in a step S43 shown in FIG. 15, and the directory list 28b is created in a step S45. In a step S47, the 9 directories pointed by the pointers P1 to P9 in the directory list 28b is accessed, the compressed thumbnail image signal is read out from the top image file of each directory, and the thumbnail image signal based on the read compressed thumbnail image signal is applied to the video encoder 30. Thus, 9 thumbnail images are multi-displayed on the television monitor 32 in order of pointing by the pointers P1 to P9.

It is determined whether or not a thumbnail selecting operation is performed in a step S49, and if "YES" is determined, the process proceeds to a step S53. In the step S53, a directory corresponding to the selected thumbnail image is accessed, the compressed primary image signal is read out from each image file stored in the access destination directory, and the primary image signal based on the read compressed primary image signal is applied to the video encoder 30. The reading-out is performed in the order of the file number every ⅓ second and thus, a motion image is displayed on the television monitor 32. After completion of motion image reproduction from the access destination directory, the process returns to a step S47. It is determined whether or not the reproducing completion operation (an operation of the completion key 24c) is performed in a step S51, and if "YES" is determined, the process returns to the step S1.

Figure 16:
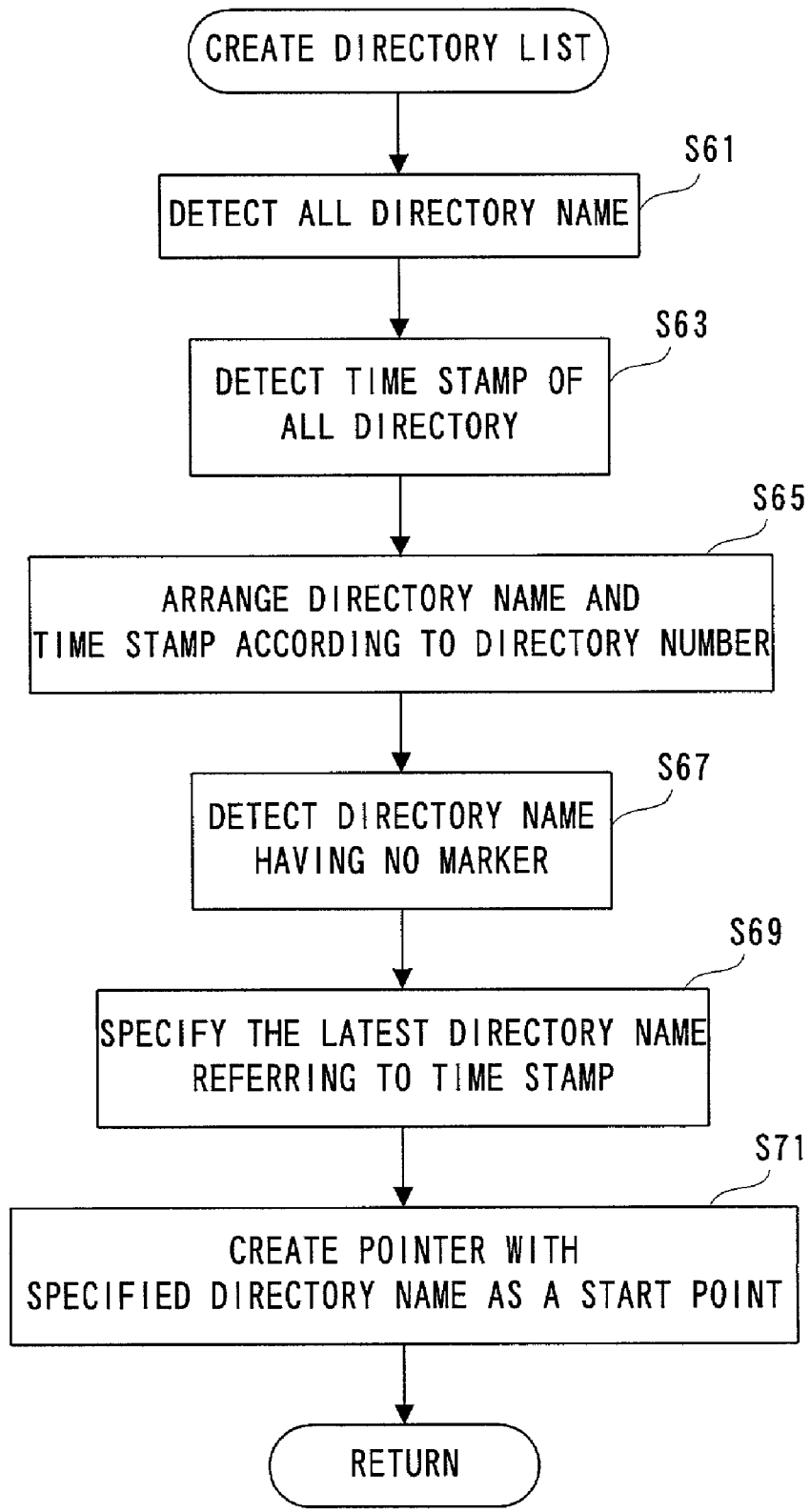
FIG. 16 is a flowchart showing another part of the operation of FIG. 1 embodiment.

A directory list creating process in the step S3 or the step S45 complies with a subroutine shown in FIG. 16. First, the directory name and the time information of all directories are detected from the hard disk 20 in steps S61 and S63, respectively, and the directory name and the time information are arranged in the order of the directory number in a step S65. Thus, the table T shown in FIG. 8 or FIG. 9 is created. Directory names having no marker are detected from the created table T in a step S67, and a directory name of the latest directory is specified among the directory names having no marker referring to the time information in a step S69, and the pointers P1 to P50 are respectively assigned to the directory names with the specified directory name as the starting point in a step S71. Therefore, a creation of the directory list 28b shown in FIG. 8 or FIG. 9 is completed. After completion of the process in the step S71, the process is restored to a hierarchal upper level of a routine.

Figure 17:
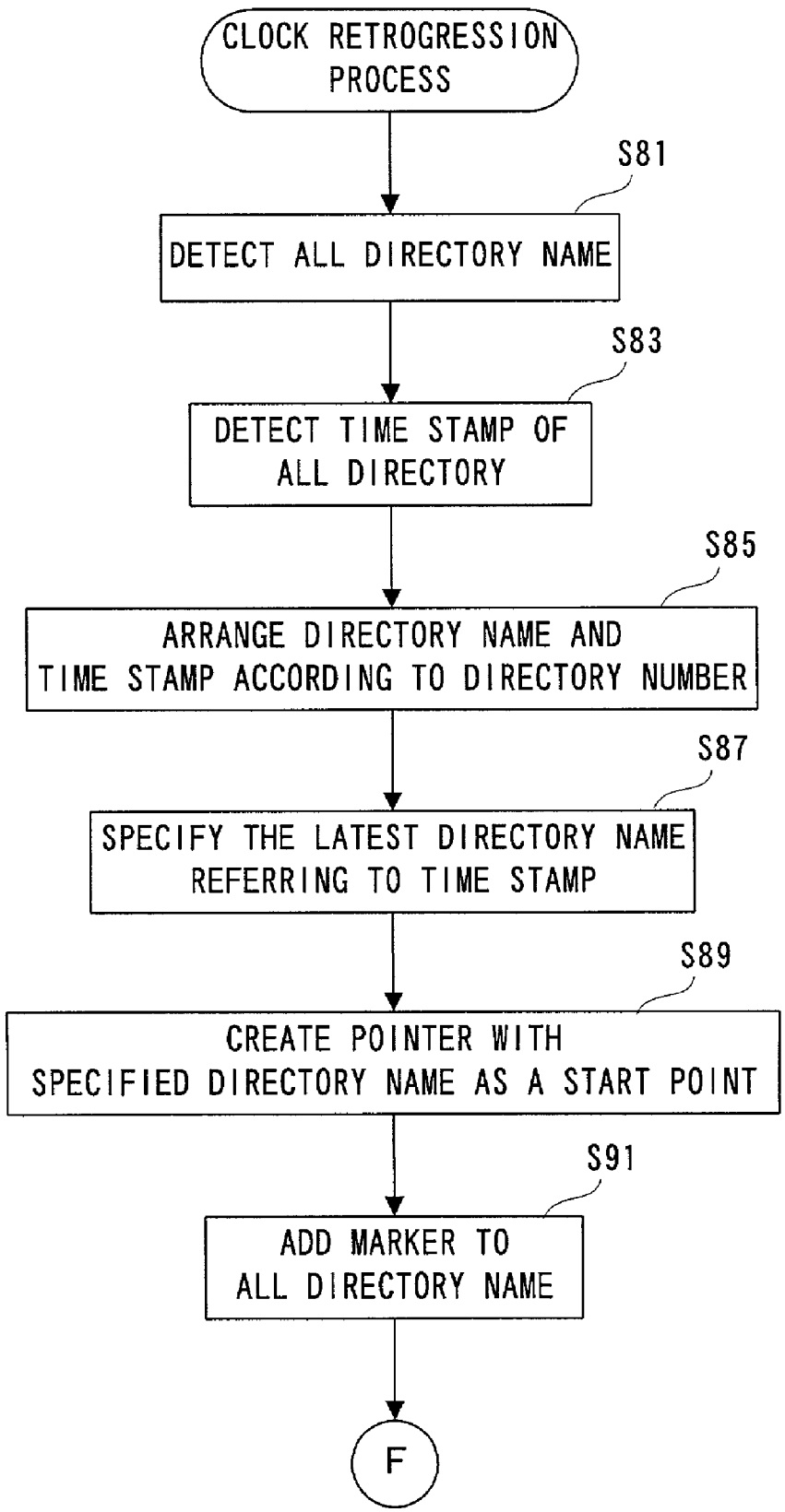
FIG. 17 is a flowchart showing the other part of the operation of FIG. 1 embodiment.
Figure 18:
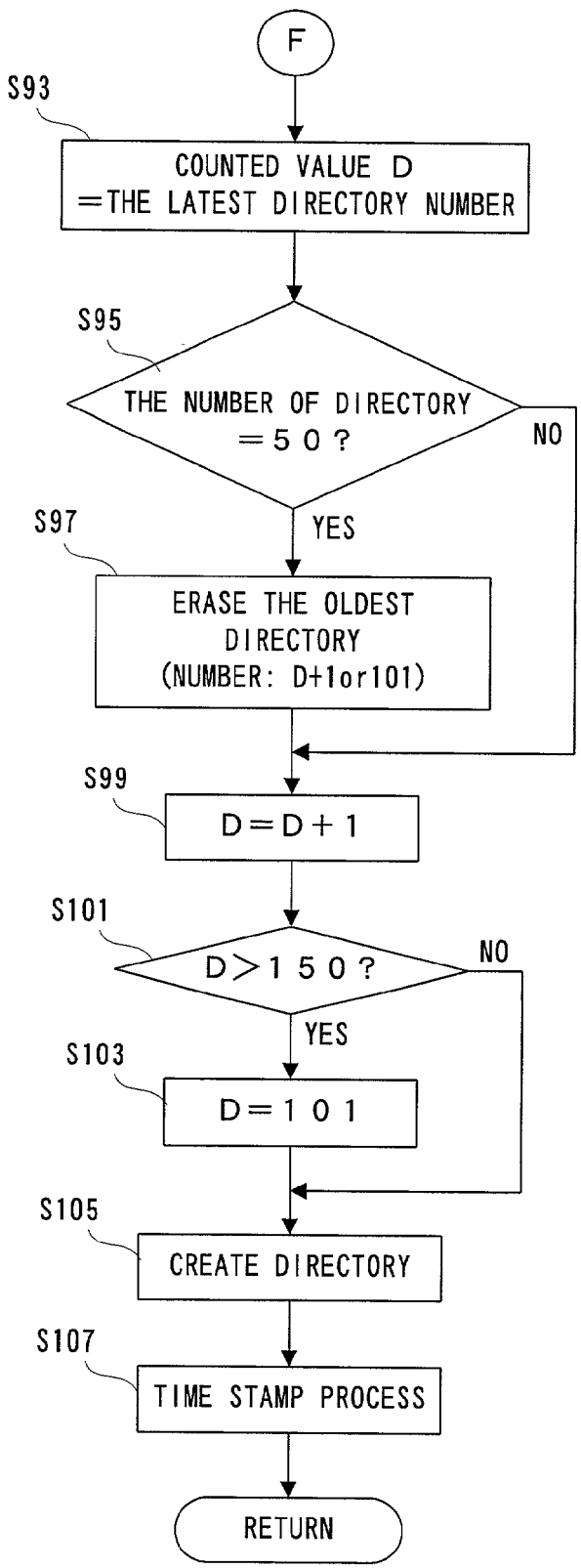
FIG. 18 is a flowchart showing a further part of the operation of FIG. 1 embodiment.

The clock retrogression process in the step S41 complies with subroutines shown in FIG. 17 and FIG. 18. First, the same processes as the steps S61 to S65 shown in FIG. 16 are performed in steps S81 to S85, and the table T shown in FIG. 10(A) is created. The directory name of the latest directory is specified from the table T referring to the time information in a following step S87, and the pointers P1 to P50 are respectively assigned to the directory names with the specified directory name as the starting point in a step S89. Therefore, the directory list 28b shown in FIG. 10(A) is created. It is noted that since the oldest directory is erased prior to the clock retrograssion process, a point destination by the pointer P50 is not specified. The markers are added to all the directory names registered in the table T and all the directory names recorded on the hard disk 20 in a step S91. Thus, the directory list 28b is renewed from FIG. 10(A) to FIG. 10(B), and the directory names on the hard disk 20 are renewed as well.

Figure 12:
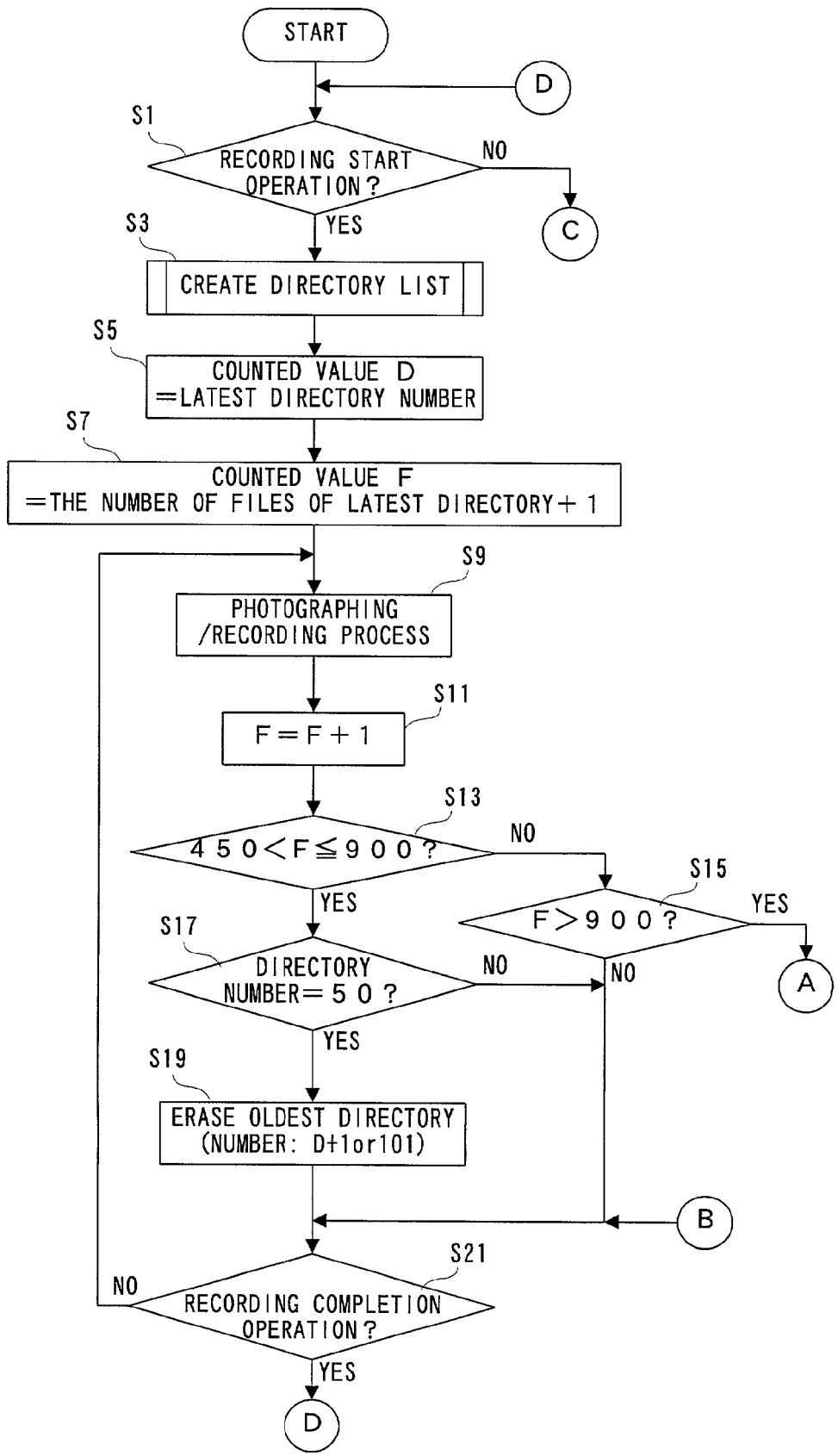
FIG. 12 is a flowchart showing a part of an operation of FIG. 1 embodiment.
Figure 13:
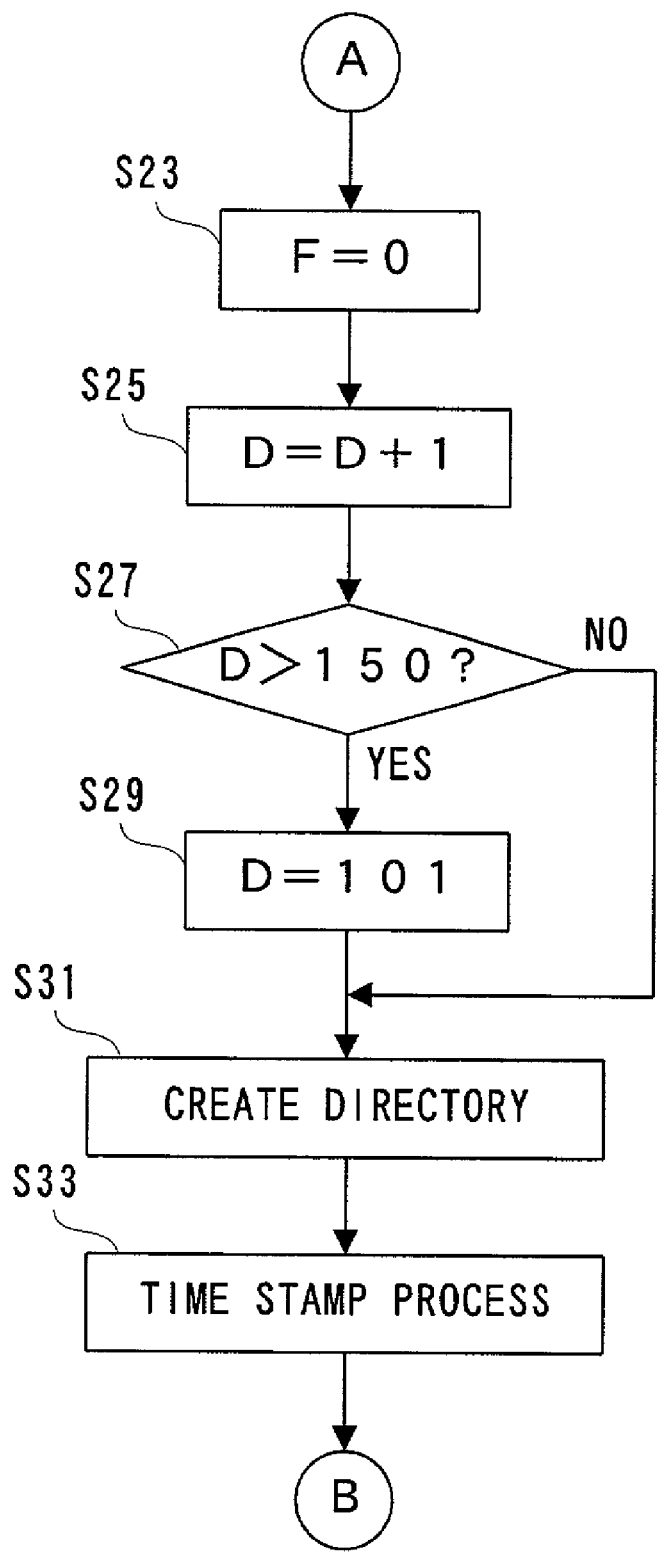
FIG. 13 is a flowchart showing another part of the operation of FIG. 1 embodiment.

After completion of the adding processing of the markers, the process proceeds to a step S93, and the directory number of the latest directory pointed by the pointer P1 is set as the counted value D. The same processes as the steps S17 and S19 shown in FIG. 12 are performed in steps S95 and S97. That is, the oldest directory is erased according to the number of directories created on the hard disk 20. The same processes as the steps S25 to S33 shown in FIG. 13 are performed in steps S99 to S107, and a new directory to which the time information according to the clock 28a is assigned is created on the hard disk 20. After completion of the process in the step S107, the process is restored to the hierarchal upper level of the routine.

As understood from the above description, the directory is created on the hard disk 20 as necessary and the time information according to the clock 28a is assigned thereto. The image file is stored in the latest directory having the latest creation time among the plurality of directories thus created. When the time indicated by the clock 28a is modified retroactive to the past, the marker is added to a directory having the time information according to the clock 28a before modification. The latest directory is detected on the basis of such the marker and the time information. When the time indicated by the clock 28a is modified retroactive to the past, the new directory is created and the time information according to the clock 28a after modification is assigned to the new directory. Therefore, the new directory is detected as the latest directory immediately after the clock 28a is modified retroactive to the past.

Thus, even if the time of the clock 28a is modified retroactive to the past, the image file is sure to be stored in the latest directory. Therefore, the storing destination of the image file is not out of sequence, and it is possible to properly manage the image file.

Furthermore, when a total number of directories reaches 50, the oldest directory having the oldest creation time is detected on the basis of the marker and the time information so as to be erased. Therefore, when the hard disk 20 has limitations of a capacity, the capacity is reserved by erasing the directory being the least important. It is noted that the circularly successive directory number is assigned to each directory in the order of creating. Thus, the oldest directory becomes a directory having the directory number succeeding to that of the latest directory.

Furthermore, in reproducing, ranking according to the creation time is assigned to each directory on the basis of the marker and the time information. The thumbnail images representative of respective directories are displayed on the television monitor 32 in the ranking. Accordingly, it is possible to recognize the contents of the respective directories.

In addition, in such the surveillance camera fixed at the predetermined position of this embodiment, no great change occurs on the object. If the storing destination of the image file including such the object image is out of sequence between directories, it is difficult to recognize the contents of recording. A method for determining the creation time of the directory by the marker and the time information as the present invention produces an outstanding advantage in a case of being applied to the surveillance camera.

It is noted that although only the television monitor is a separate body in this embodiment, if the surveillance camera is formed only by the image sensor and the signal processing circuit, the main body is formed by the operation panel, the CPU, the HDD and etc., and the main body and the television monitor is placed at the security guards room, it is possible to construct a large-scale surveillance camera system including a plurality of surveillance cameras, one main body and the television monitor.

Furthermore, although this embodiment is described utilizing the surveillance camera, it is needless to say that the present invention can be applied to a consumer-use digital camera. In addition, although the time information including a year, a month, a date, an hour, a minute, a second is assigned to the directory in this embodiment, information at the end portion ("year" or "second") may be omitted as necessary.

In addition, when the time of the clock is modified retroactive to the past, the marker is added to the created directory, and the latest directory is specified on the basis of the marker and the time information in this embodiment. However, the latest directory can be specified by modifying the time information of the created directory according to the modification of the clock (for example, when a time is retroactive to 5 hours, the time information of each directory is also retroactive to 5 hours). Furthermore, the latest directory can be also specified by constantly reserving the directory name of the latest directory in another memory (nonvolatile memory) and assigning the pointer, in creating the directory list, with the directory name as the starting point.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image signal processing apparatus storing an image signal in any one of a plurality of directories each of which is created as necessary and time information according to a time counter is assigned to, comprising:

a first assigner for assigning ,when a time indicated by the time counter is modified retroactive to the past, a marker to a directory having the time information according to the time counter before modifying the time;

a first detector for detecting a latest directory having a latest creation time on the basis of the marker and the time information; and a storage for storing the image signal in the latest directory.

2. An image signal processing apparatus according to claim 1, further comprising:

a creator for creating a new directory when the time indicated by the time counter is modified retroactive to the past; and a second assigner for assigning to the new directory the time information according to the time counter after modifying the time.

3. An image signal processing apparatus according to claim 1, further comprising:

a second detector for detecting an oldest directory having the oldest creation time on the basis of the marker and the time information; and an eraser for erasing the oldest directory when a predetermined condition is satisfied.

4. An image signal processing apparatus according to claim 3, wherein each directory has an identification number circularly successive in order of a creation, and said eraser erases the directory having the identification number succeeding to the identification number of the latest directory.

5. An image signal processing apparatus according to claim 1, further comprising:

a third assigner for assigning ranking according to the creation time to each directory on the basis of the marker and the time information; and a displayer for displaying a representative image of each directory according to the ranking.

6. An image signal processing apparatus according to claim 5, wherein said third assigner assigns the ranking to one of the directories to which the markers are assigned and the directories to which the markers are not assigned on the basis of the time information, and then, assigns the ranking to another of the directories to which the markers are assigned and the directories to which the markers are not assigned on the basis of the time information.

7. An image signal processing apparatus according to claim 1, further comprising an image sensor fixed at an arbitrary position, wherein the image signal is an image signal of an abject photographed by said image sensor.

8. An image data processing apparatus, comprising:

a creator for creating a directory when a creation condition is satisfied;

a first assigner for assigning time information indicative of a time specified by a time counter to the directory created by said creator;

a second assigner for assigning a marker to each of the directories already created by said creator when the time specified by the time counter is modified retroactive to the past;

an extractor for extracting directories to each of which no marker is assigned from among the directories created by said creator when a recording start operation is carried out;

a first detector for detecting a directory to which time information indicative of a latest time is assigned from among the directories extracted by said extractor as a latest directory; and a recorder for recording image data to the latest directory detected by said first detector.

9. An image data processing apparatus according to claim 8, wherein the creation condition includes a time modification condition that a modification operation to modify the time specified by said time counter retroactive to the past has been carried out, and said first assigner includes a time information assigner for assigning time information based on a time which has been modified by the modification operation to the directory created by said creator.

10. An image data processing apparatus according to claim 8, further comprising:
   a second detector for detecting a directory having the oldest creation time as an oldest directory on the basis of the marker and the time information; and
   an eraser for erasing the oldest directory detected by said second detector when an erasing condition is satisfied.

11. An image data processing apparatus according to claim 10, wherein the directory created by said creator has an identification number circularly successive in order of a creation, and the oldest directory is a directory having an identification number subsequent to an identification number of the latest directory.

12. An image data processing apparatus according to claim 8, further comprising:
   a third assigner for assigning ranking in order of a creation to the directories created by said creator on the basis of the marker and the time information when a reproduction start operation is carried out; and
   a displayer for displaying representative images of the directories created by said creator according to the ranking assigned by said third assigner.

13. An image data processing apparatus according to claim 12, wherein said third assigner assigns the ranking to one of the directories to which the markers are assigned and the directories to which the markers are not assigned on the basis of the time information, and then, assigns the ranking to another of the directories to which the markers are assigned and the directories to which the markers are not assigned on the basis of the time information.

14. An image data processing apparatus according to claim 8, further comprising an image sensor fixed at a designated position, wherein the image data represents an object photographed by said image sensor.

* * * * *